(12) United States Patent
Hsieh et al.

(10) Patent No.: US 6,879,356 B2
(45) Date of Patent: Apr. 12, 2005

(54) OPTICAL DEVICE HAVING AN E-MODE POLARIZER

(75) Inventors: Pao-Ju Hsieh, Hsinchu (TW); Hui-Lung Kuo, Taipei (TW); Yuh-Shiun Wu, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 123 days.

(21) Appl. No.: 10/336,733

(22) Filed: Jan. 6, 2003

(65) Prior Publication Data

US 2004/0130672 A1 Jul. 8, 2004

(51) Int. Cl.[7] .............................................. G02F 1/1335
(52) U.S. Cl. ........................................ 349/96; 349/99
(58) Field of Search ............................ 349/96, 98, 105, 349/115, 194; 359/483, 494, 495, 498, 487, 490, 491

(56) References Cited

U.S. PATENT DOCUMENTS

| | | | |
|---|---|---|---|
| 5,737,044 A | 4/1998 | Van Haaren et al. | |
| 5,825,444 A | 10/1998 | Broer et al. | |
| 6,061,108 A | 5/2000 | Anderson et al. | |
| 6,088,079 A | 7/2000 | Kameyama et al. | |
| 6,245,399 B1 * | 6/2001 | Sahouani et al. | 428/1.31 |
| 6,538,714 B1 * | 3/2003 | Sahouani et al. | 349/194 |
| 6,784,954 B2 * | 8/2004 | Yamaoka et al. | 349/96 |
| 2003/0086170 A1 * | 5/2003 | Hamamoto et al. | 359/491 |
| 2003/0184862 A1 * | 10/2003 | Sahouani et al. | 359/490 |

FOREIGN PATENT DOCUMENTS

WO    WO 97/19385    5/1997

OTHER PUBLICATIONS

Yeh et al, "Extraordinary polarizers for LCD".*

* cited by examiner

Primary Examiner—Kenneth Parker
(74) Attorney, Agent, or Firm—Birch, Stewart, Kolasch & Birch, LLP

(57) ABSTRACT

An optical device has an E-mode polarizer. The optical device has an E-mode polarizer, a ¼ wave phase retardation plate, and a cholesteric reflective polarizer. The E-mode polarizer is a linear dichroic polarizer and enables extraordinary light to pass. The ¼ wave phase retardation plate is sandwiched between the E-mode polarizer and the cholesteric reflective polarizer.

13 Claims, 8 Drawing Sheets

OPTICAL DEVICE HAVING AN E-MODE POLARIZER

BACKGROUND OF THE INVENTION

1. Field of the Invention

The invention relates to an optical device, and more particularly to an optical device having an E-mode polarizer to enhance brightness and viewing angle property and prevent color shift.

2. Description of the Related Art

Of all panel display types, only liquid crystal display (LCD) uses linearly polarized light to create brightness, darkness, and grey level. In general, a polarizer is employed to transform incident light provided by a backlight module into the linearly polarized light. In detail, as shown in FIG. 1, a conventional optical device has a lamp 10 that provides incident light to one side of a diffuser plate 12. After the light enters a dichroic polarizer 14 with unidirectional light absorbing nature, the linearly polarized light in one direction is absorbed, and the linearly polarized light in another direction passes to accompany twisted liquid crystal molecules, causing a variation in brightness to display plentiful images. Since the dichroic polarizer 14 absorbs half the incident light, however, reducing a large part of the source luminescence, the brightness of the conventional LCD is about 4~6% of the brightness of the lamp 10. Accordingly, before the light enters the polarizer, an advance treatment on the incident light is needed to generate a specific linearly polarized light that completely passes through the polarizer, resulting in enhanced efficiency of the light source and subsequent increased luminescence of the LCD.

In order to solve the above-described problems, some research suggests that the backlight module directly generates the linearly polarized light, but this idea is difficult to realize. In other research, a reflective polarizer that itself does not absorb light is employed to significantly enhance luminescence of the LCD. The reflective polarizer, providing a light recycling mechanism, comprises a retro-reflective type and a cholesteric type. The former reflective polarizer deals with the linearly polarized light, but has disadvantages of complicated processes and difficulties in mass production for manufacturing more than 800 layers' structures. The cholesteric reflective polarizer deals with the circularly polarized light, and has advantages of simplified process and facility in mass production only if an appropriate liquid crystal control technology is utilized.

FIG. 2 is a schematic diagram of a conventional optical device having a cholesteric reflective polarizer 16. The cholesteric reflective polarizer 16 has a cholesteric liquid crystal layer 15. When the cholesteric liquid crystal molecules are arranged as a planar alignment, the helix structure 15A makes the optic axis perpendicular to the substrates. Therefore, the cholesteric liquid crystal layer 15 can separate the unpolarized incident light into right-handed/left-handed circularly polarized light, in which the circularly polarized light having opposite handness to molecular helix can be transmitted and the same-handed circularly polarized light can be reflected. Thereafter, using a reflective surface under the diffuser plate 12, the reflected-type light can be easily transformed into the transmitted-type light that can pass through the cholesteric liquid crystal layer 15. Concretely, a right-handed light $19C_R$ is transformed into a left-handed light $19C_L$, and then the left-handed light $19C_L$ can pass through the cholesteric liquid crystal layer 15 to becomes unitary-handed type light $19C_U$. Thus, all of the light from the lamp 10 can be transformed into unitary circularly polarized light, that is, there will be two-time light theoretical. Moreover, when a ¼ wave phase retardation plate 18 is cooperated with the cholesteric reflective polarizer 16, the circularly polarized light $19C_U$ can be further transformed into the linearly polarized light 19N. Finally, the incident light provided by the lamp 10 is completely transformed into the linearly polarized light 19N passing through the polarizer, thus increasing the luminescence of the LCD.

The cholesteric reflective polarizer 16 has an optical anisotropic nature that changes the color related to the reflective light in accordance with the change in the viewing angle. This color shift in off-axis is explained by Bragg reflection theorem: $n_o p\cos\theta < \lambda < n_e p\cos\theta$, wherein $\lambda$ indicates the main wavelength of the reflected light from the cholesteric liquid crystal layer, $n_o$ and $n_e$ indicate the ordinary and extraordinary refractive indexes of the cholesteric liquid crystal respectively, p indicates a helix pitch corresponding to a $2\pi$ molecular rotation, and $\theta$ indicates a viewing angle. When the viewing angle is increasing, the wavelength of the reflected light is decreasing to cause color shift. This color shift in off-axis is also explained by a qualitative analysis as the follows. The helix structure 15A of the cholesteric liquid crystal can be regarded as a discotic molecule as viewing the superimposed structure from a normal direction. When the viewing angle gradually increases, the discotic molecule with symmetrical profile gradually changes into an elliptic molecule with long axis and short axis, causing different phase shifts in accordance with different wavelengths.

In order to compensate for the color shift, several methods have been developed as follows. In U.S. Pat. No. 5,737,044 and U.S. Pat. No. 5,825,444, Philips company discloses a broadband cholesteric polarizer whose surface of maximum helix pitch faces the light source. Also, in WO97/19385, Nitto Denko discloses a cholesteric polarizer whose surface of minimum helix pitch faces the radiation source. Unfortunately both rely on experimental results, not theoretical calculations, and it is realized that the compensation function is lost at a large viewing angle. Additionally, in U.S. Pat. No. 6,061,108, Sharp company discloses a multi-layer structure including pairs of cholesteric layers and compensating layers to allow the effective bandwidth of the polarizer to be increased. The cost of this structure is, however, too high to effectively utilize. Finally, U.S. Pat. No. 6,088,079 discloses an optical element comprising a cholesteric liquid crystal layer and a retardation compensating plate that has a value Nz=−1.2~0.2.

SUMMARY OF THE INVENTION

The present invention is directed to an optical device having an E-mode polarizer to enhance brightness and viewing angle property and prevent color shift.

Accordingly, the present invention provides an optical device with an E-mode polarizer, a ¼ wave phase retardation plate, and a cholesteric reflective polarizer. The E-mode polarizer is a linear dichroic polarizer and enables extraordinary light to pass. The ¼ wave phase retardation plate is sandwiched between the E-mode polarizer and the cholesteric reflective polarizer.

DESCRIPTION OF THE DRAWINGS

For a better understanding of the present invention, reference is made to a detailed description to be read in conjunction with the accompanying drawings, in which.

DETAILED DESCRIPTION OF THE INVENTION

Figure 1:
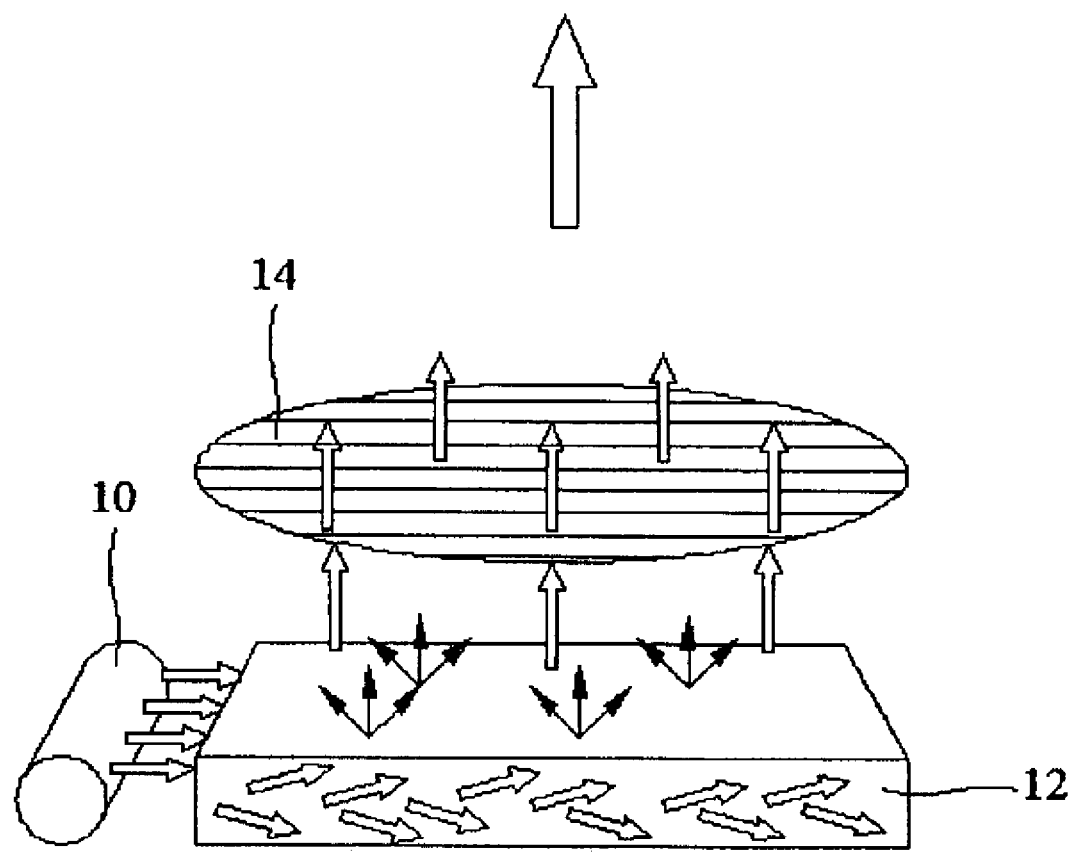
FIG. 1 is a schematic diagram of one conventional optical device having a dichroic polarizer.
Figure 2:
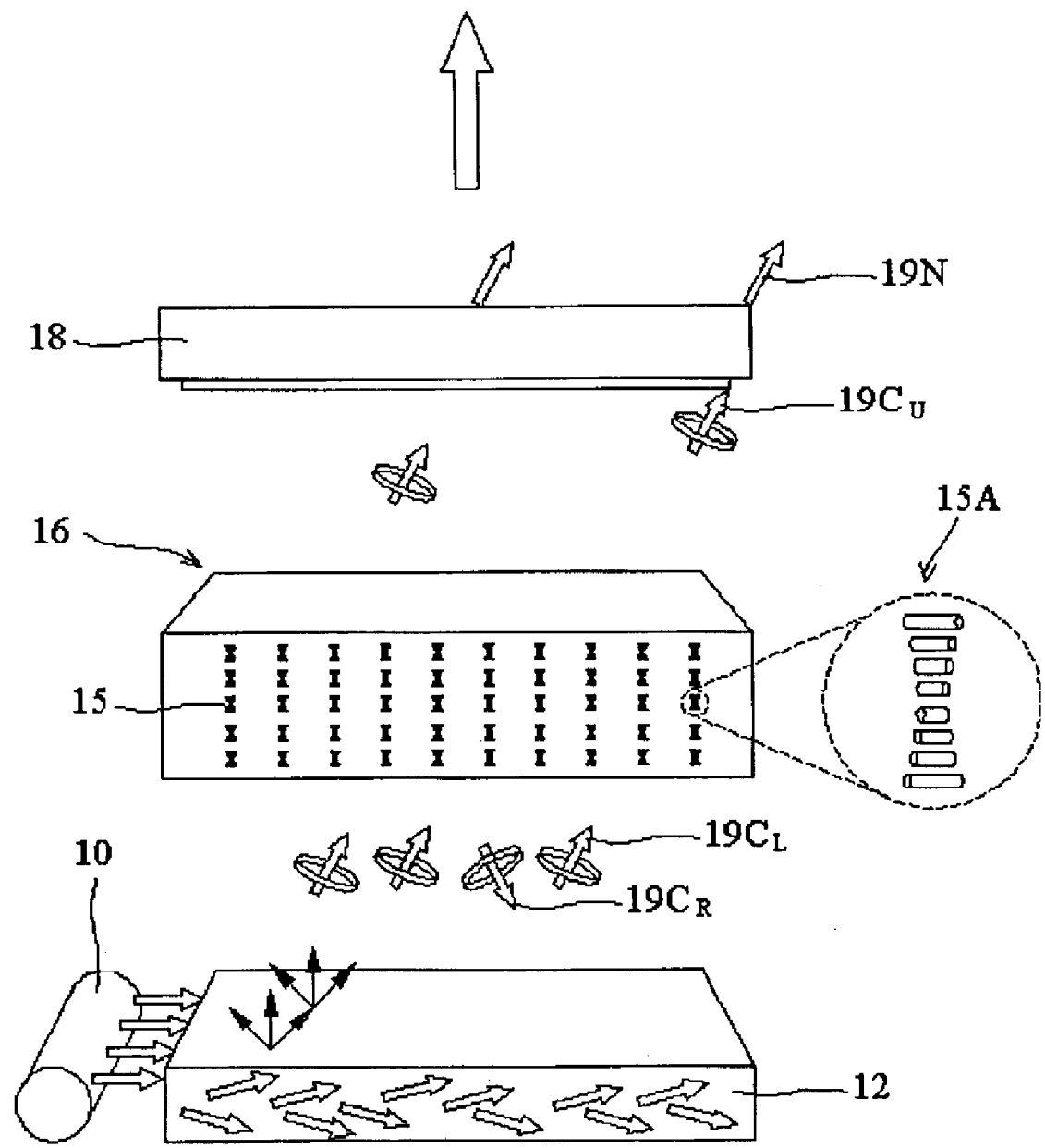
FIG. 2 is a schematic diagram of another conventional optical device having a cholesteric reflective polarizer.
Figure 3:
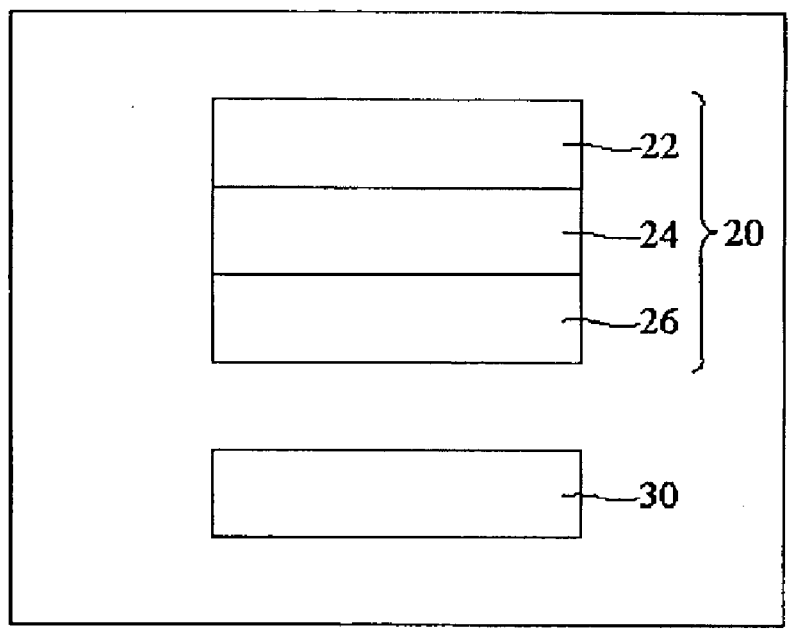
FIG. 3 is a sectional view of an optical device according to the present invention.

FIG. 3 is a sectional view of an optical device according to the present invention. An optical device 20 has applications on a backlight module 30, and comprises an E-mode polarizer 22, a ¼ wave phase retardation plate 24 and a cholesteric reflective polarizer 26, in which the ¼ wave phase retardation plate 24 is sandwiched between the E-mode polarizer 22 and the cholesteric reflective polarizer 26. The E-mode polarizer 22 is employed to solve color shift caused by the cholesteric reflective polarizer 26.

Figure 4A:
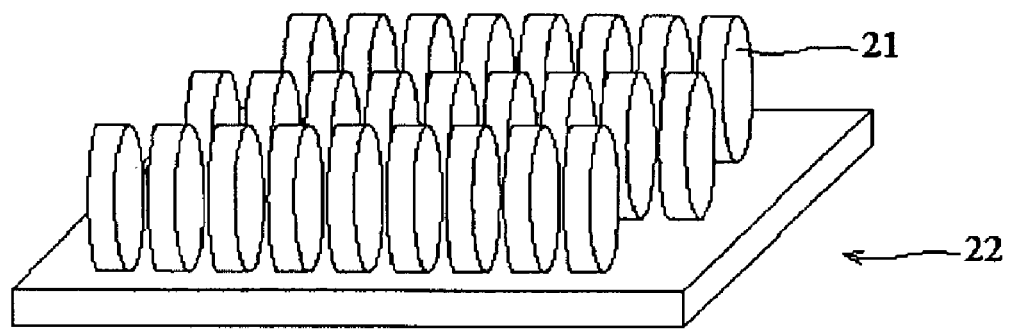
FIG. 4A is a schematic diagram of the molecular arrangement of the E-mode polarizer according to the present invention.
Figure 4B:
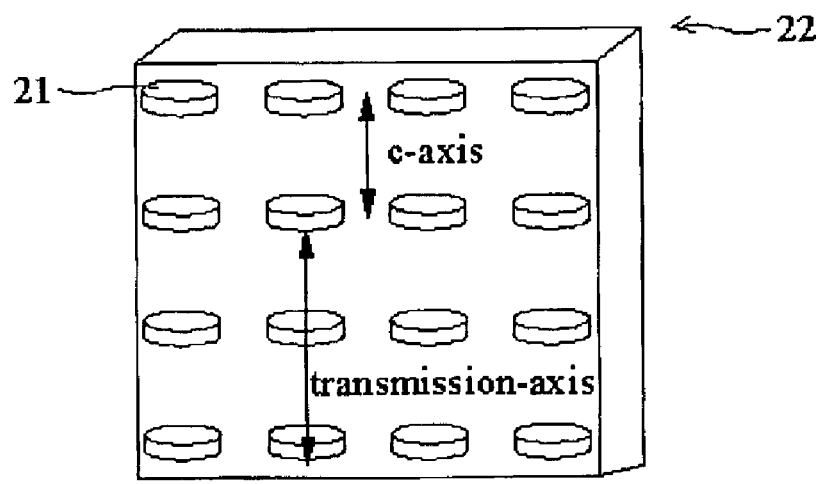
FIG. 4B indicates the transmission axis of the E-mode polarizer according to the present invention.
Figure 4C:
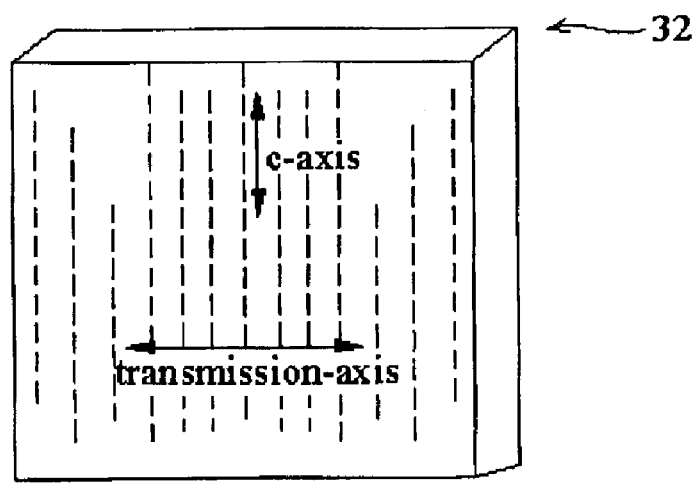
FIG. 4C indicates the transmission axis of a conventional O-mode polarizer compared to FIG. 4B.

FIG. 4A is a schematic diagram of the molecular arrangement of the E-mode polarizer 22. FIG. 4B indicates the transmission axis of the E-mode polarizer 22. FIG. 4C indicates the transmission axis of a conventional O-mode polarizer 32 compared to FIG. 4B. Unlike a conventional linear dichroic polarizer 32, called an O-mode polarizer 32 (as shown in FIG. 4C) that enables ordinary light to pass, the E-mode polarizer 22 enables extraordinary light to pass. Preferably, as shown in FIG. 4A and FIG. 4B, the E-mode polarizer 22 has a supramolecular structure in which the molecules 21 are superimposed in a two-dimensional translational order and columnar arrangement, like stacked discotic liquid crystal molecules. The optic axis of the superimposed molecules 21 is parallel to the alignment orientation, and that is, the transmission axis of the superimposed molecules 21 is parallel to the alignment orientation and parallel to c axis (the rotation axis of z axis). The absorbing axis of the superimposed molecules 21 is a section of the columnar arrangement and perpendicular to the alignment orientation.

Figure 5:
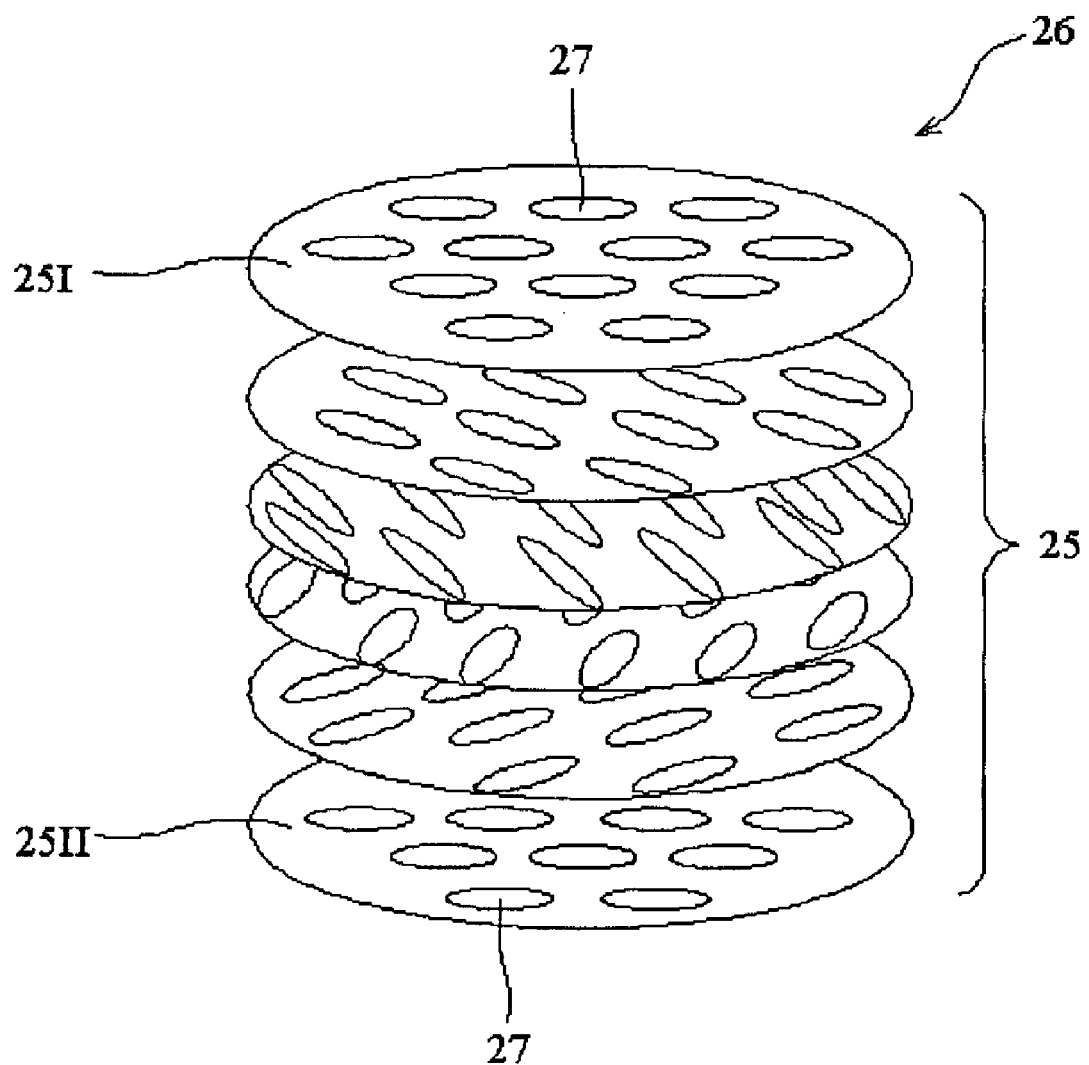
FIG. 5 is a schematic diagram of the molecular arrangement of the cholesteric reflective polarizer according to the present invention.

FIG. 5 is a schematic diagram of the molecular arrangement of the cholesteric reflective polarizer. The cholesteric reflective polarizer 26 characteristically separates non-polarized light into circularly polarized light. The cholesteric reflective polarizer 26 has a cholesteric liquid crystal layer 25, in which the molecules are arranged as a helix structure and the molecules 27 disposed in the outer layer (including the uppermost layer 25I and the lowermost layer 25II) are parallel to the alignment orientation, that is, arranged in planar orientation. In order to contain a visible light area, the cholesteric liquid crystal layer 25 has several different pitches in thickness direction. Also, the cholesteric liquid crystal layer 25 may be made of a single-layered or multi-layered structure. Moreover, the dimensional variation of the pitches may successively increase, successively decrease, non-continuously increase or non-continuously decrease.

The ¼ wave phase retardation plate 24 transforms the circularly polarized light into linearly polarized light. Also, the ¼ wave phase retardation plate 24 may be a single-layered or multi-layered structure. Moreover, the ¼ wave phase retardation plate 24 is adjacent to the E-mode polarizer 22, and the optic axis of the ¼ wave phase retardation plate 24 is associated with the optic axis of the E-mode polarizer 22. Preferably, the difference between the two optic axes is 45 degrees.

The optical device 20 provides one mechanism generating two-time polarized light, that is, enhancing brightness and another decreasing the color shift caused by the cholesteric reflective polarizer 26. Also, the optical device 20 employs the E-mode polarizer 22 to compensate for the color shift caused by cholesteric reflective polarizer 26 so as to enhance the brightness in a wider viewing-angle range. Thus, the optical device 20 may also serve as a viewing-angle enhancement element of the backlight module 30, or a viewing-angle enhancement film of a display. Particularly, when the optical device 20 is used as a viewing-angle enhancement element of the backlight module 30 with a reflective plate, the cholesteric reflective polarizer 26 can serve as a bottom polarizer, and the combination of the optical device 20 and the backlight module 30 used in an LCD can improve the brightness and viewing angle property, and also solve the problem of color shift.

Figure 6:
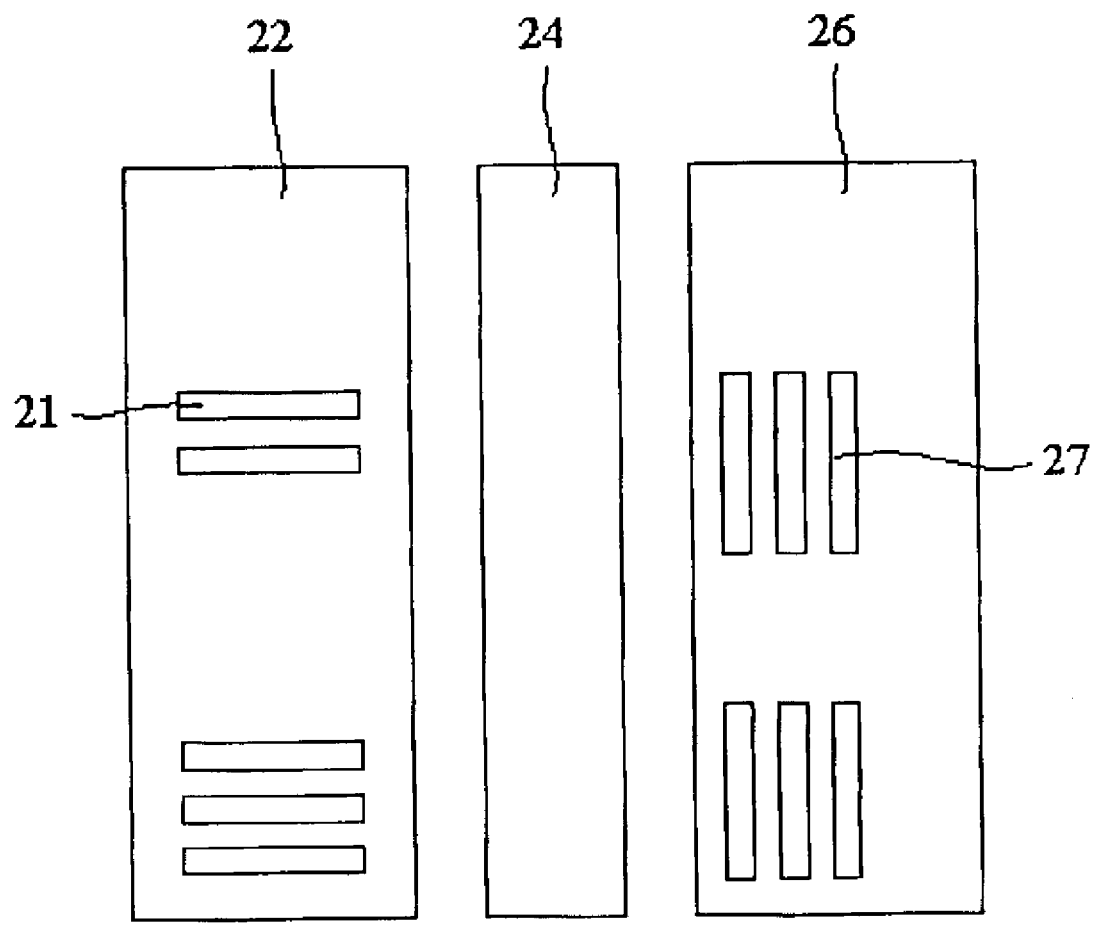
FIG. 6 is a schematic view showing optical compensation provided by the optical device according to the present invention.

FIG. 6 is a schematic view showing optical compensation provided by the optical device 20. In the cholesteric reflective polarizer 26, the discotic molecules 27 of the superimposed structure are parallel to the planar orientation. In the E-mode polarizer 22, the discotic molecules 21 of the superimposed structure are perpendicular to the planar orientation. Therefore, the molecules 21 can compensate for the molecules 27 to eliminate color shift caused by the cholesteric reflective polarizer 26 and generate polarized light.

EXAMPLE

Figure 7A:
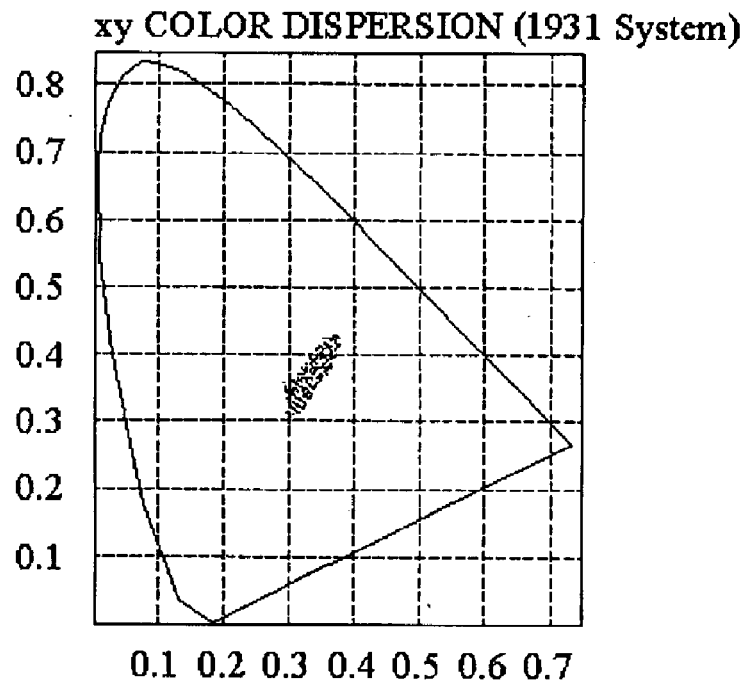
FIG. 7A is a color-shift distribution diagram in full viewing angles of a conventional optical device including the O-mode polarizer/the ¼ wave phase retardation plate/the cholesteric reflective polarizer.
Figure 7B:
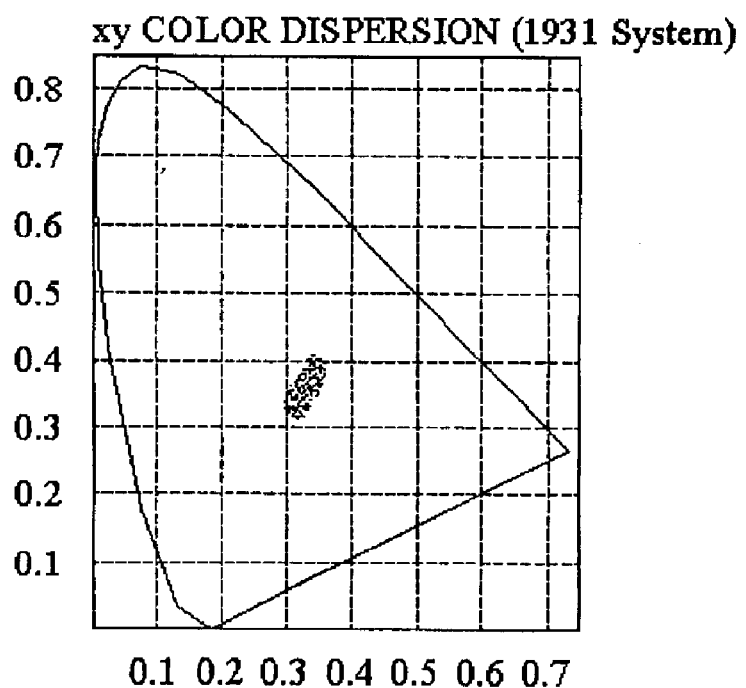
FIG. 7B is a color-shift distribution diagram in full viewing angles of the optical device including the E-mode polarizer/the ¼ wave phase retardation plate/the cholesteric reflective polarizer.
Figure 8A:
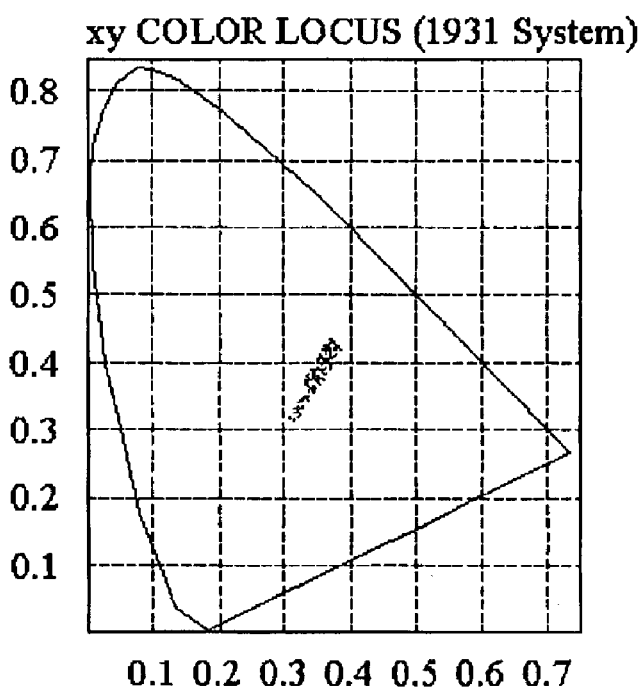
FIG. 8A is a color-shift distribution diagram in horizontal direction of a conventional optical device including the O-mode polarizer/the ¼ wave phase retardation plate/the cholesteric reflective polarizer.
Figure 8B:
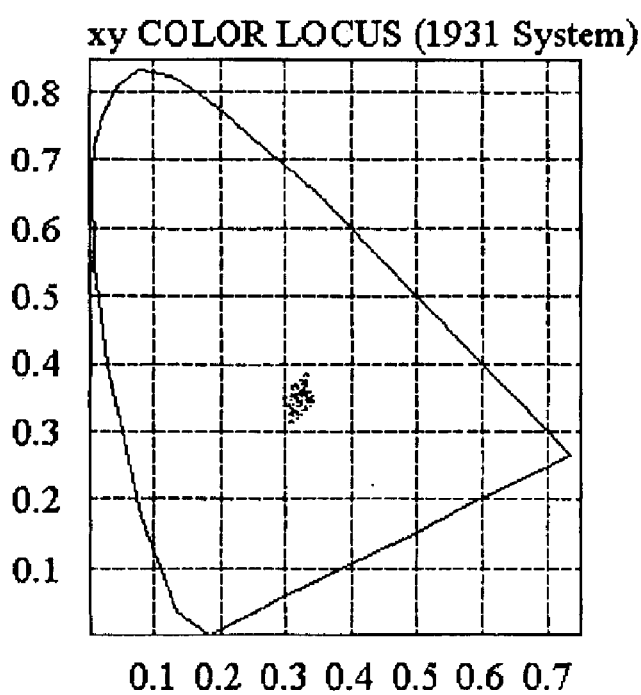
FIG. 8B is a color-shift distribution diagram in horizontal direction of the optical device including the E-mode polarizer/the ¼ wave phase retardation plate/the cholesteric reflective polarizer.

FIG. 7A is a color-shift distribution diagram in full viewing angles of a conventional optical device including the O-mode polarizer/the ¼ wave phase retardation plate/the cholesteric reflective polarizer. FIG. 7B is a color-shift distribution diagram in full viewing angles of the optical device 20, including the E-mode polarizer 22/the ¼ wave phase retardation plate 24/the cholesteric reflective polarizer 26. FIG. 8A is a color-shift distribution diagram in horizontal direction of a conventional optical device including the O-mode polarizer/the ¼ wave phase retardation plate/the cholesteric reflective polarizer. FIG. 8B is a color-shift distribution diagram in horizontal direction of the optical device 10 including the E-mode polarizer 22/the ¼ wave phase retardation plate 24/the cholesteric reflective polarizer 26. The experimental results shown in FIGS. 7 and 8 verify that the E-mode polarizer 22 solves the problem of color shift.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical device, comprising:
   an E-mode polarizer being a linear dichroic polarizer that enables extraordinary light to pass;
   a ¼ wave phase retardation plate; and
   a cholesteric reflective polarizer;
   wherein the ¼ wave phase retardation plate is sandwiched between the E-mode polarizer and the cholesteric reflective polarizer.
   wherein the cholesteric reflective polarizer has a cholesteric liquid crystal layer arranged in a helix structure, and the cholesteric liquid crystal layer has several different pitches in thickness direction and the E-mode polarizer at least partially compensates for colorization due to the cholesteric reflective polarizer.

2. The optical device of claim 1, wherein the E-mode polarizer comprises a transmission axis parallel to the alignment orientation and an absorbing axis perpendicular to the alignment orientation.

3. The optical device of claim 1, wherein the E-mode polarizer comprises a transmission axis parallel to C axis (the rotation axis of Z axis).

4. The optical device of claim 1, wherein the E-mode polarizer comprises a supramolecular structure in which molecules are superimposed in a two-dimensional translational order and columnar arrangement.

5. The optical device of claim 4, wherein the optic axis of the superimposed molecules is parallel to the alignment orientation.

6. The optical device of claim 1, wherein the cholesteric reflective polarizer transforms unpolarized light into circularly polarized light.

7. The optical device of claim 1, wherein the dimensional variation of the pitches successively increases, successively decreases, non-continuously increases or non-continuously decreases.

8. The optical device of claim 1, wherein the cholesteric reflective polarizer is a single-layered or multi-layered structure.

9. The optical device of claim 1, wherein the ¼ wave phase retardation plate transforms the circularly polarized light transformed by the cholesteric reflective polarizer into linearly polarized light.

10. The optical device of claim 1, wherein the ¼ wave phase retardation plate is a single-layered or multi-layered structure.

11. The optical device of claim 1, wherein the difference between the optic axis of the ¼ wave phase retardation plate and the optic axis of the E-mode polarizer is 45 degrees.

12. A backlight module, comprising:
    a viewing-angle enhancement element, wherein the viewing-angle enhancement element comprises:
       an E-mode polarizer being a linear dichroic polarizer that enables extraordinary light to pass;
       a ¼ wave phase retardation plate; and
       a cholesteric reflective polarizer;
    wherein the ¼ wave phase retardation plate is sandwiched between the E-mode polarizer and the cholesteric reflective polarizer;
    wherein the cholesteric reflective polarizer has a cholesteric liquid crystal layer arranged in a helix structure, and the cholesteric liquid crystal layer has several different pitches in thickness direction and the E-mode polarizer at least partially compensates for colorization due to the cholesteric reflective polarizer.

13. A display comprising:
    a brightness enhancement film, wherein the brightness enhancement film comprises:
       an E-mode polarizer being a linear dichroic polarizer that enables extraordinary light to pass;
       a ¼ wave phase retardation plate; and
       a cholesteric reflective polarizer;
    wherein the ¼ wave phase retardation plate is sandwiched between the E-mode polarizer and the cholesteric reflective polarizer;
    wherein the cholesteric reflective polarizer has a cholesteric liquid crystal layer arranged in a helix structure, and the cholesteric liquid crystal layer has several different pitches in thickness direction and the E-mode polarizer at least partially compensates for colorization due to the cholesteric reflective polarizer.

* * * * *